Sept. 18, 1928.  
H. G. DORSEY  
1,684,759  
DEVICE FOR THE REPRODUCTION OF WAVE MOTION  
Filed Sept. 21, 1923   2 Sheets-Sheet 1
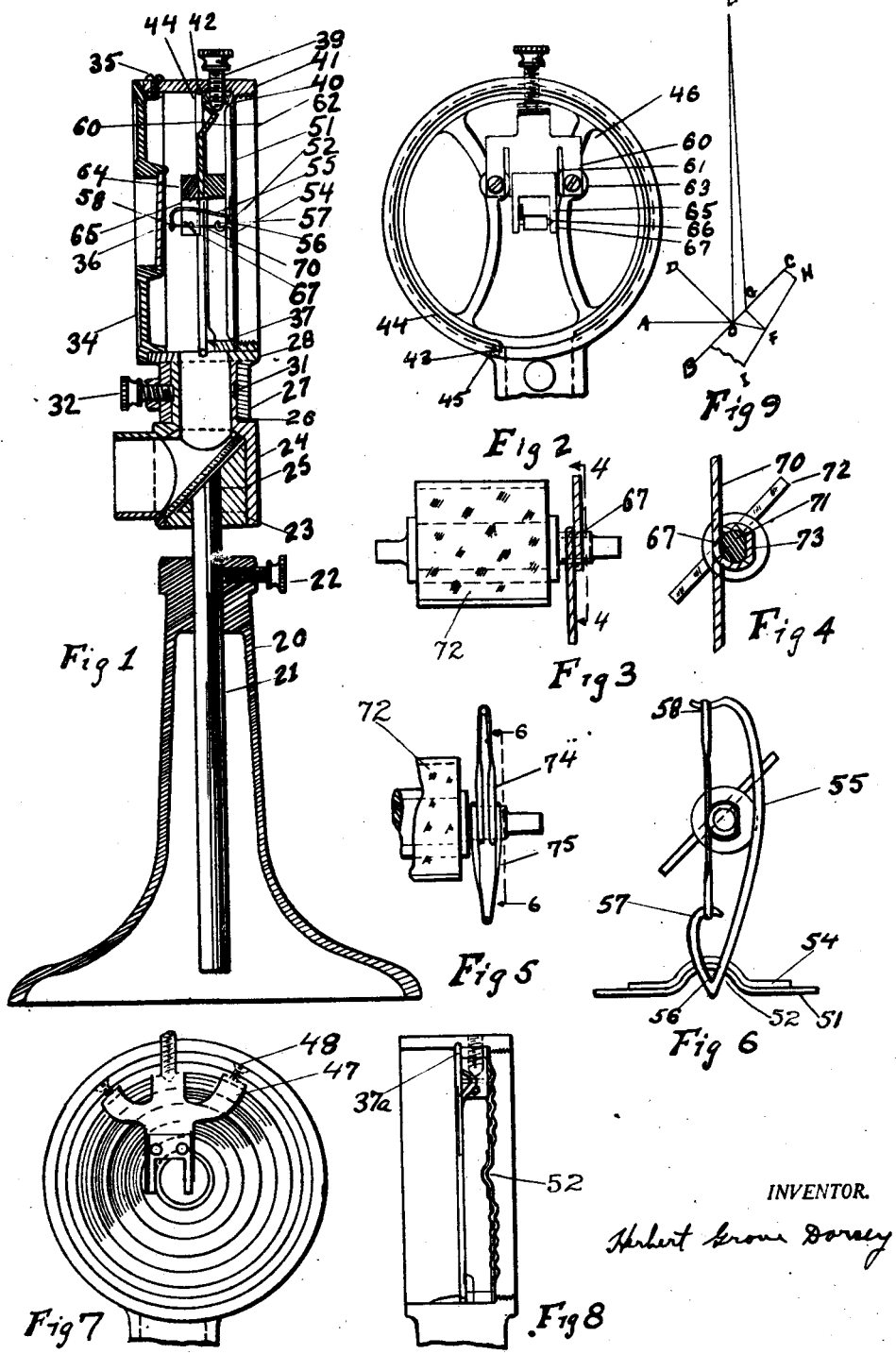
INVENTOR.  
Herbert Grove Dorsey Sept. 18, 1928.                                          1,684,759
                    H. G. DORSEY
        DEVICE FOR THE REPRODUCTION OF WAVE MOTION
                Filed Sept. 21, 1923      2 Sheets-Sheet 2

INVENTOR
Herbert Grove Dorsey

Patented Sept. 18, 1928.

1,684,759

UNITED STATES PATENT OFFICE.

HERBERT GROVE DORSEY, OF GLOUCESTER, MASSACHUSETTS.

DEVICE FOR THE REPRODUCTION OF WAVE MOTION.

Application filed September 21, 1923. Serial No. 664,087.

My invention relates to the reproduction of wave motion for sound, electricity or for any wave whose energy can be made to actuate a diaphragm or some similar means in which the vibration of the diaphragm or similar means operates to change the relative angle of incidence of a beam of light upon a mirror, rotatable by the diaphragm and thereby reproduce the wave motion of the energy source by reflection from the mirror upon a revolving mirror and then upon a screen.

An object of this invention is to provide an instrument capable of reproducing any wave motion but more particularly is associated with the reproduction of sound and electrical vibrations such that the amplitudes and changes in the amplitudes of the wave may be made visible to the observer.

For the faithful reproduction of any wave motion so that the amplitudes of the produced visible wave shall be proportioned to the amplitudes of the source wave, it is necessary to have a system that will not amplify one wave frequency more than another. It is well known in the art that diaphragms commonly used in the telephones and the like instruments have definite resonant frequencies, and that waves of these frequencies are greatly amplified as compared with other non-resonant frequencies in their reproduction by means of resonant diaphragms. In my invention I employ a diaphragm whose resonant frequency is above that of the frequencies of the waves which are to be reproduced which diaphragm is made with a high resonant point by causing internal stresses in the diaphragm by methods of cooling.

Another object of my invention is to provide an easily adjustable mechanism for reflecting the source of light upon the mirror actuated by the diaphragm and means for adjusting the mirror.

Still another object of my invention is to provide means for keeping the mirror in permanent adjustment. A further purpose of my invention is to facilitate the easy projection of wave forms upon a screen or other means by means of the mirror actuated by the diaphragm throwing a beam upon a rotating mirror.

Other purposes of my invention will be noted from the description, construction and assembly of my device as will appear hereafter in the specification and drawings of which;

Fig. 1 is a sectional view of my improved form of wave reproducing apparatus.

Fig. 2 is a side view of the upper portion of the device.

Fig. 3 is an enlarged detail drawing of the spindle and thread.

Fig. 4 is an end view of the parts shown in Fig. 3.

Fig. 5 shows another means of mounting the thread upon the spindle.

Fig. 6 is a sectional view of the mirror and the actuating mechanism.

Fig. 7 is a modified form of the parts shown in Fig. 2.

Fig. 8 shows a side view of the parts shown in Fig. 7.

Fig. 9 is a diagrammatic view of how light passes from the source to the screen.

Figure 10:
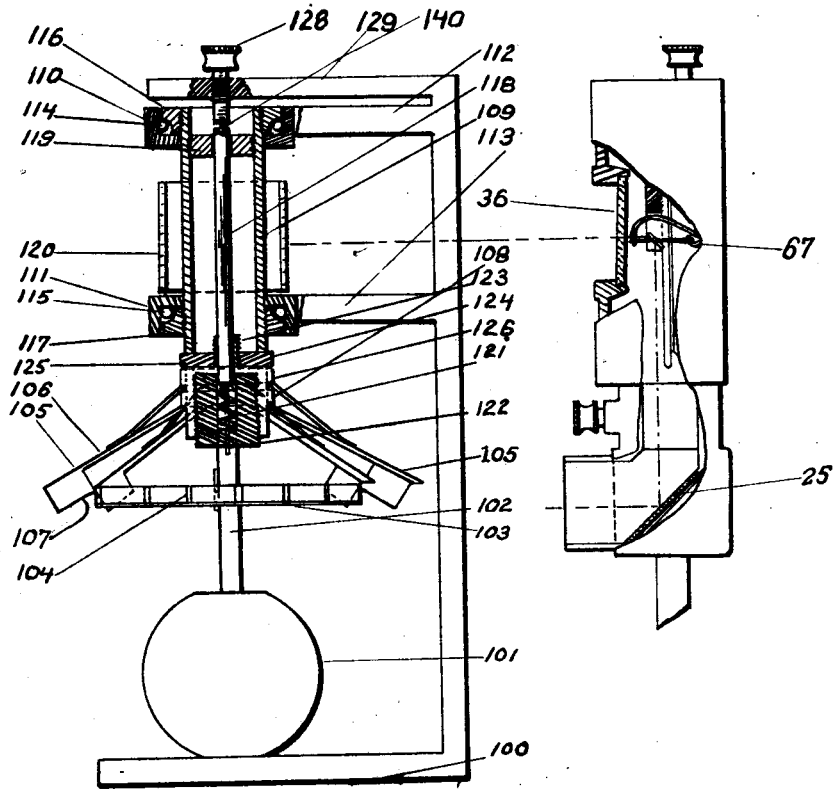
Fig. 10 shows the complete system for projecting the vibrations on a screen with a means for rotating the mirror.

The present invention aims to overcome some of the difficulties inherent in the previous instruments as disclosed in my Patent No. 1,017,392, and in the Bowron English Patent 26,412 of Nov. 29th, 1907. Bowron for example, specifically mentions that he had trouble with the thread around the mirror spindle slipping, and I have found in my own experience that this slipping of the thread on the spindle may cause serious bother unless it is properly corrected.

In most of the rotating mirrors, as now constructed there is insufficient control of the speed so that the mirror continually tends to change its speed of rotation, causing much inconvenience to the operator.

In the preferred form of the invention there is a base, 20, in which the rod, 21, may be clamped at any convenient height by the clamping screw, 22, and carried by a threaded joint at the upper end of the rod is an elbow, 23, which has a projecting cap, 24, and which supports a mirror 25, placed at 45 degrees to the vertical. The upper end, 26, of the elbow is fitted into the collar, 27, of the casing, 28, so that the latter may be rotated about the elbow, 23. There is a groove, 31, in the upper part of the elbow into which the screw 32, projects, which serves to hold the casing and the elbow together, and when the screw 32 is tightened, it clamps the two together in any desired position. The front of the casing is closed by a lid, 34, held by screws 35, and which has an opening closed by a lens, 36 inclined at an angle so that the top part leans toward the interior as shown in Fig. 1. Inside the casing, there is a frame, 37 into which is threaded an adjusting screw, 39 passing freely through the slot 41 in the casing. The screw 39, has a conical point 40. In the casing 28, there is a groove 42 terminating in a hole 43 into which there is placed a spring wire, 44 having a right angle bend 45 entering hole 43, and which serves to hold the frame in the casing so it may rotate a slight amount.

The frame, 37 may have the truss 46, either as an integral part of the frame or it may be a separate part 47, secured by screws 48 as shown in Fig. 7. To the rear of the frame 37, there is rigidly attached a diaphragm 51, having its centre embossed at 52, to which is soldered a magnetic piece 54. Attached at the center is a bow 55, having eyelet, 56, inside the concavity of the embossment, and the two ends of the wire forming the bow bent into the two hooks, 57 and 58. Fastened to frame 37 is a spring 60, having slots 61, and a bent portion, 62 said frame attached by screws 63 at the ends 64. To the middle portion of this spring 60 is attached a fork 65 in which are the jewels 66, forming a rotatable mounting for the spindle 67. The thread 70, passes around the spindle 67, and has its ends attached to the hooks 57 and 58.

The spindle 67, has a flat place 71, to which is cemented the mirror 72, and another flat place 73 at 45 degrees to the flat place 71, and around it passes the thread 70. The purpose of the flat place 71 is such that the thread 70 by passing around the sharp edges of the flat place obtains a better grip on the spindle, preventing the latter from slipping. The flat portions 71 and 73 are so related that when the mirror 72, is vibrated through any of its ordinary angles the thread 70 is operating on a cylindrical portion of the spindle 67 so that it transmits to the spindle a uniform motion proportional to the displacement of the diaphragm. If this relation between the two flat portions is not approximately maintained when the mirror is vibrating through large amplitudes the thread would be operating on a flat portion instead of the cylindrical portion, and consequently would introduce distortion into the curves.

Another method which I have employed is using a loop of thread or ribbon instead of a single thread around the spindle, as shown in Figs. 3 and 4, where one end of the loop 74 passes through the other end of the loop 75 and around the spindle, so that the four portions of the loop are so related to each other that the stress on the spindle is evenly balanced. By this method of communicating the motion from the diaphragm to the spindle, there is no tendency to cause the ends of the spindle to rotate about the points of contact of the thread with the spindle, thus decreasing the friction of the spindle in the supporting jewels. It also gives a tighter grip on the spindle, producing less tendency to slipping; furthermore it permits more rapid assembly since the loops may be made of a definite size beforehand and assembled by simply attaching one end of the loop to one hook, passing the other end around the spindle and attaching it to the other hook when the bow 55, has been bent a slight amount.

In either method of attaching, the bow is bent before the thread is attached, so that when the bow is released, it produces a stretched condition of the thread so that it grips the spindle tightly.

In this class of instruments it is desirable that it be able to respond to a great variety of different frequencies, and in order to respond to the higher frequencies, the diaphragm must either have its own natural frequency higher than any frequency one wishes to show, or else such frequencies must produce forced vibrations on the vibrating system. Furthermore to show the higher harmonics the whole vibrating system must be kept as light as possible or else these harmonics will be suppressed. The high natural frequency may be obtained by using a stiff diaphragm, but in this case it requires considerable energy to put the diaphragm in vibration. In order to maintain the high natural frequency with thin material, and yet keep a simple form of construction, the following method of attachment of the diaphragm has been devised. If the diaphragm and the ring to which it is soldered, are of the same material they will both have the same coefficient of linear expansion, and being at the same temperature when soldered, will cool together and so leave the diaphragm in a natural condition. If, however the diaphragm can be held at a higher temperature than the ring, the latter cooled at a more rapid rate than the diaphragm, when they are both cooled to room temperature, the diaphragm is left in a stretched condition, thus allowing it to have a higher frequency than it would otherwise have.

If the metals are dissimilar, such as an iron diaphragm, and a brass ring, and they are soldered in the ordinary manner, the iron diaphragm not only will not be stretched but will be slightly buckled, whereas having the diaphragm at a higher temperature than the ring and cooling the ring quickly, even the iron diaphragm may be left in a stretched condition.

One method of accomplishing this, is to have the diaphragm 51, on a hot plate and the ring or frame 37 on another plate, just at the melting point of solder, which serves as a plate for tinning the frame. The diaphragm, having been brought to a temperature much higher than the melting point of solder, and having been moistened with soldering fluid, or otherwise prepared so that the solder will stick to it, the frame 37 is transferred quickly from the hot plate to the diaphragm 51, and a heavy weight is placed on top of the frame, thus pressing the frame 37 and the diaphragm 51, firmly together. A cold air blast is then directed upon the frame 37, and at the same time the heat supply of the plate supporting the diaphragm is removed. By this method the ring is cooled so much more rapidly than the diaphragm, that there is no tendency to stretch the diaphragm until the two are firmly united, and the diaphragm then cooling more slowly will be left in a stretched condition.

Another method of putting the diaphragm in a stretched condition which I have used is to put corrugations or indentations, or both, into the diaphragm after it has been attached to the frame, as shown in Figs. 7 and 8. To do this a press may be employed having the corresponding surfaces necessary to make corrugations in the diaphragm, and also slots running through the dies so that the truss 46 of the frame may fit into the recesses, which would have the effect of producing corrugations with radial indentations such as described in my Patent 1,017,392. The frame may be made up of the ring 37ª, and a separate truss part 47 secured to the ring by the screws 48, in which case the diaphragm 51, having been attached to the ring, 37ª, may be corrugated in the regular manner, well known to those versed in the art, and the separate truss part 47 then fastened into place.

Still another method I have employed to produce a stretched diaphragm is to solder it to a brass frame, in any convenient manner such as on a heated plate and then hammer or squeeze the ring perpendicular to the plane of the diaphragm, so that the ring is stretched around the periphery thus stretching the diaphragm itself and raising its natural frequency from about 300 before hammering to about 1000 cycles per second after. After the hammering or squeezing process, the frame is turned in the lathe and given a finishing cut to fit the casing.

It will be seen that these methods of stretching the diaphragm to raise its frequency to a permanent higher value are different from the well known method of clamping the edge and screwing in a ring to displace the diaphragm bodily, my method permitting a cheaper method to accomplish the same result, in what is believed to be a novel manner. A noticeable feature of these methods of producing a stretched diaphragm is that the diaphragm may be permanently stretched after it is put in place which is advantageous in many cases where it is desirable to obtain lightweight diaphragms of high pitch.

Another embodiment of this invention is the unique way in which the light is transmitted from the source to the vibrating mirror 72, by reflecting from the fixed mirror 25. This mirror may be silvered on the first surface, in which case there is only one image of the source, or it may be a mirror silvered on the second surface. Ordinarily, however, if silvered on the second surface there will be formed two images of the source, one brighter than the other, resulting in a lack of sharpness of the spot of light so that curves are not so well defined as they would be if there were only one image. To produce one image only and still have the advantage of a mirror silvered on the second surface, if the mirror is wedge shape, as shown in Fig. 9, the incident light A. O. will be reflected in the direction O. E. in the well known manner of making the angle of incidence A. O. D. equal to the angle of reflection D. O. E. and the reflected light will follow the line O. F. G. E. in such a manner that the image reflected from the second surface will coincide with the image reflected from the first surface at some distance O. E., which is a function of the thickness of the glass, of the index of reflection of the glass, the angle of incidence, the angle of the wedge, and the distance O. E. If this distance O. E. is made the principal distance at which the screen is operated, and the angle of incidence A. O. D. is fixed at 45 degrees, and since the index of refraction is fairly constant, it is only necessary to select the glass of such thickness and of such angle and wedge, as to fulfill the necessary condition.

In practice this is easily done by looking at a spot of light at a distance from the glass equal to the distance O. E. having the eye at a distance equal to the distance the source of light would be from the mirror in actual use, rotating the glass until a single image of the source of light is seen. An ellipse is now cut from the glass, having the major axes in the plane of the angle of incidence and reflection, which insures that the glass when silvered will act as a mirror, fulfilling the condition above given.

Figure 11:
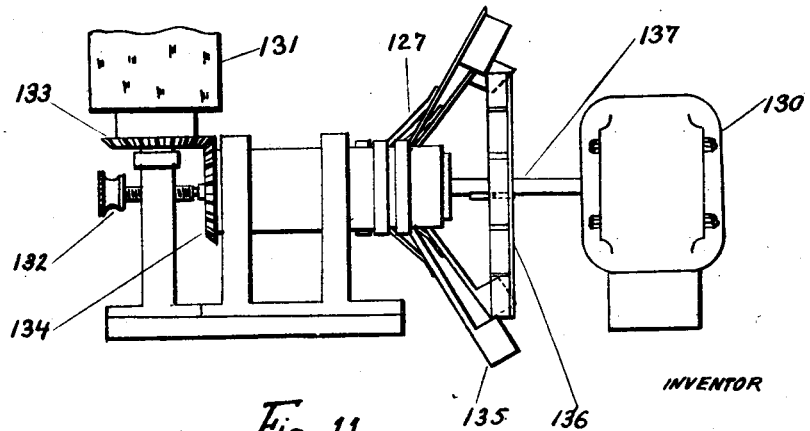
Fig. 11 shows a modification of Fig. 10.

Another embodiment of this invention is the method whereby the beam of light is reflected to the screen by a rotating mirror, so that one may be able to see the shape of the curve projected by this improved form of apparatus. It is of greatest importance that a simple method of control is employed to insure uniform and constant angular rotation of the mirror, and to obtain this result I have found it advantageous to use the apparatus as shown in Figures 10 and 11. Essentially the apparatus embodies a centrifugal governor but one adaptable to respond quickly to changes in speed of the motor furnishing the power to rotate the mirror.

The source of power to rotate the mirror 120 is furnished by a motor 101 mounted on a base 100 as shown in Figure 10. To the shaft 102 of the motor is keyed or fitted a fan 103 rotated by the shaft 102. The fan 103 may be of the type used in vacuum cleaners, which forces the air out radially in the plane of rotation of the blades 104 so that as the blades 105, which rotate the shaft carrying the mirror 120, are forced upwards and outwards, they catch less of the stream of the air which imparts the necessary energy for rotation. The blades 105 are made of some springy material and of suitable thickness for the purpose consisting of a flat spring portion 106 whose one end is bent at right angles with the flat portion to form a leaf 107.

The other end of the spring is a part of a collar 108 fixed firmly on the shaft 109 carrying the mirror 120. The blades 105 with their bent leaves and collar portion, may be stamped as one piece of metal, and the collar fitted and joined about the shaft 109.

The shaft 109 is supported for rotation by two bearings 110 and 111, similar to the kind used supporting the sprocket wheel of a bicycle. The bearings 110 and 111, on the brackets 112 and 113 respectively, carry the ball bearing races 114 and 115. The shaft 109 carries the cone shaped caps 116 and 117 which may be adjustably screwed on the shaft 109 to hold the shaft steadily but without much friction to motion in both a vertical and horizontal position.

The blades 105 may be initially adjusted to the proper position in the following manner. Within the shaft 109 which is hollow is a second shaft 118 having the same axis as the shaft 109. A spacing ring 119, screwed in the shaft 109 serves to hold the upper end of the shaft 118 in a central and upright position while the lower end of the shaft 118 fits into the hole of the lower cap 122 screwed in the shaft 109 and rests upon a spring 121. The shaft 118 has also a collar 123 which screws into the enlarged but rectangular portion of rod 124 which is free to move in slots 125 diametrically opposite in the hollow shaft 109. Below the rod 124 is a collar 126 free from the shaft 109, but having supporting rods 127 connecting to the flat spring portion 126 in such a manner that when the small rod 124 moves downward, bearing upon the collar 126, the rods 127 are made to bear upon the spring pieces 106, thus forcing the leaf portions 105 downward into the stream of air.

The rod 124 is made to bear upon the collar 126 as above described by means of the screw 128 threaded through the bracket 129 into the shaft 118. The screw 128 has a cone bearing on its end, fitting into a small jewel bearing 140, in the top of the shaft 118 so that the friction due to the rotation of the shaft will at once be uniform and slight. By screwing the screw 128 downwards against the upward thrust of the spring 121 the rod 124 bears upon the collar 126 which forces the spring piece 106 and the leaves 105 downward into the stream of air created by the motor fan 103.

The beam of light as evident from Fig. 10 comes into the mirror 25, and is reflected to the mirror 67, through the lens 36 to the mirror 120 which rotates and is adapted to throw light upon a screen. The purpose of the apparatus shown in Fig. 10 is to maintain a constant speed of the rotating mirror 120 so that the light thrown upon the screen is spread uniformly at all times. This is essential in giving a true picture of the wave motion operating the small mirror 67.

In Fig. 11 is shown a modified form of the construction of Fig. 10. Here the motor is mounted horizontally as shown in 130, while the mirror 131 is mounted vertically. The set screw 132 serves the same purpose as that of 128 and so all the rest of the apparatus. Motion is imparted to the vertical mirror through the beveled gears 133 and 134, the latter of which is driven by the blades 135 which receive their energy through the fan 136 rotated by the motor shaft 137.

If one wishes to increase the speed of rotation it is only necessary to turn the set screw 128 or 132 in Figs. 10 and 11 according to which modification is employed indirectly forcing the blades 105 downward into the maximum energy of the air stream. Not only will the speed be increased through method just mentioned but there will also be a tendency to increase the speed through the governor action of the spring pieces. When the speed of the blades 105 are decreased the centrifugal action, as is well known decreases the speed and thus there is a double action in the regulation, furnishing sensitive control.

This form of rotating mirror and governor enables one to control the speed of the motor while it is running, so that successive waves will be superposed on each other just as with a synchronous motor, since after the correct speed is reached the governing action of the spring blades will maintain it.

Having now described my invention, I claim:

1. An apparatus for producing wave motion comprising two unit instruments, the first of said units, comprising a diaphragm, a vibratable mirror, mounted upon an axis, parallel to the plane of the diaphragm, transmission means for transmitting the vibration of the diaphragm to the mirror, a second mirror within the casing of the said first unit adapted to reflect a beam of light upon the first mirror and a third uniformly rotating mirror, in the second of said units adapted to receive and reflect the light of said first mirror.

2. In an apparatus for producing wave motion, a diaphragm, a rotatable mirror mounted upon an axis parallel to the plane of the diaphragm, transmission means for transmitting the vibration of the diaphragm to the mirror, a second mirror, positioned at an angle approximately 45 degrees from the horizontal, and adapted to reflect a beam of light to the said first mirror.

3. In an apparatus for producing wave motion, a diaphragm, a rotatable mirror, mounted upon an axis parallel to the plane of the diaphragm, transmission means for transmitting the vibration of the diaphragm to the mirror, comprising a bow mounted upon the diaphragm, a cord, a spindle mounted perpendicular, and in the same plane with the cord of said bow, said spindle containing a flat portion whose edge grips the cord wound about the spindle, said mirror mounted upon a second flat portion of the spindle, whereby the motion of the diaphragm is transmitted to the mirror without any slipping upon the spindle.

4. In an apparatus for reproducing wave motion, a diaphragm, a reflecting means vibratable about an axis parallel to the plane of the diaphragm, positive means for transmitting vibrations of the diaphragm to said reflection means, and a second reflecting means so positioned as to reflect a beam of light to the said first reflecting means.

5. In an apparatus for showing wave motion, the combination of a diaphragm, a vibratable reflecting means associated therewith, a second reflecting means positioned to throw a beam of light on said first reflecting means and thence to a third rotating reflecting means having adjustable governed speed.

6. A pivoted spindle having indicating means, a tensioned driving means encircling a portion of said spindle, and a flattened place on said portion to prevent slippage of said driving means.

HERBERT GROVE DORSEY.